United States Patent
Sharifi

(10) Patent No.: US 9,344,759 B2
(45) Date of Patent: May 17, 2016

(54) ASSOCIATING AUDIO TRACKS OF AN ALBUM WITH VIDEO CONTENT

(71) Applicant: Google Inc., Mountain View, CA (US)

(72) Inventor: Matthew Sharifi, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/786,132

(22) Filed: Mar. 5, 2013

(65) Prior Publication Data

US 2014/0259041 A1    Sep. 11, 2014

(51) Int. Cl.
| | |
|---|---|
| *H04H 60/32* | (2008.01) |
| *H04N 21/439* | (2011.01) |
| *H04N 21/233* | (2011.01) |
| *G10L 25/57* | (2013.01) |
| *G06F 17/30* | (2006.01) |
| *H04N 21/858* | (2011.01) |
| *G10L 25/54* | (2013.01) |

(52) U.S. Cl.
CPC ...... *H04N 21/4394* (2013.01); *G06F 17/30743* (2013.01); *G10L 25/57* (2013.01); *H04N 21/233* (2013.01); *G06F 17/30026* (2013.01); *G06F 17/30749* (2013.01); *G10L 25/54* (2013.01); *H04N 21/858* (2013.01)

(58) Field of Classification Search
USPC .................................. 725/18, 32; 700/94
See application file for complete search history.

(56) References Cited

U.S. PATENT DOCUMENTS

| | | | |
|---|---|---|---|
| 8,245,253 B2 | 8/2012 | Gratton et al. | |
| 8,341,412 B2 | 12/2012 | Conwell | |
| 8,484,017 B1 | 7/2013 | Sharifi et al. | |
| 8,489,777 B2 | 7/2013 | Shah | |
| 8,737,817 B1 * | 5/2014 | Izo et al. | 386/287 |
| 8,751,494 B2 * | 6/2014 | Wessling et al. | 707/737 |
| 2002/0083060 A1 | 6/2002 | Wang et al. | |
| 2003/0021441 A1 * | 1/2003 | Levy et al. | 382/100 |
| 2005/0100113 A1 | 5/2005 | Corts et al. | |
| 2006/0184960 A1 * | 8/2006 | Horton et al. | 725/25 |
| 2007/0107032 A1 * | 5/2007 | Rachamadugu | 725/114 |
| 2007/0124756 A1 | 5/2007 | Covell et al. | |
| 2007/0130580 A1 * | 6/2007 | Covell et al. | 725/18 |

(Continued)

FOREIGN PATENT DOCUMENTS

| | | |
|---|---|---|
| EP | 2483889 A1 | 9/2010 |
| WO | 2011041259 A2 | 4/2011 |

OTHER PUBLICATIONS

Baluja et al., "Content Fingerprinting Using Wavelets," Google, Inc., retrieved from http://scholar.google.com/scholar?q=content+fingerprinting+using+wavelets+&btnG=&hl=en&as_sdt=0%2C24&as_vis=1, Nov. 2006, 10 pp.

(Continued)

*Primary Examiner* — Nicholas Corbo
(74) *Attorney, Agent, or Firm* — Shumaker & Sieffert, P.A.

(57) ABSTRACT

An example method comprises determining, by a computing device, an indication of video content, determining, by the computing device and based at least in part on the indication, one or more candidate albums, selecting, by the computing device, a particular candidate album of the one or more candidate albums based at least in part on a match between an audio fingerprint of an audio track included in the video content and an audio fingerprint of an audio track included in the particular candidate album, and sending, by the computing device, a message that associates the video content with the particular candidate album.

18 Claims, 4 Drawing Sheets

(56) References Cited

U.S. PATENT DOCUMENTS

| | | |
|---|---|---|
| 2007/0242880 A1 | 10/2007 | Stebbings |
| 2008/0244676 A1 | 10/2008 | DaCosta |
| 2009/0158318 A1* | 6/2009 | Levy .............................. 725/32 |
| 2010/0145708 A1 | 6/2010 | Master et al. |
| 2010/0188580 A1 | 7/2010 | Paschalakis et al. |
| 2010/0205222 A1* | 8/2010 | Gajdos et al. ................. 707/803 |
| 2011/0116719 A1 | 5/2011 | Bilobrov |
| 2011/0173208 A1* | 7/2011 | Vogel ............................ 707/746 |
| 2011/0276157 A1 | 11/2011 | Wang et al. |
| 2011/0276333 A1 | 11/2011 | Wang et al. |
| 2011/0276567 A1* | 11/2011 | Asikainen et al. ............ 707/728 |
| 2011/0311095 A1 | 12/2011 | Archer |
| 2012/0016876 A1* | 1/2012 | Oostveen et al. ............. 707/736 |
| 2012/0029670 A1 | 2/2012 | Mont-Reynaud et al. |
| 2012/0130805 A1* | 5/2012 | On et al. .................... 705/14.49 |
| 2012/0227073 A1 | 9/2012 | Hosein et al. |
| 2012/0239696 A1* | 9/2012 | Wessling et al. .............. 707/780 |
| 2012/0265328 A1* | 10/2012 | Kadirkamanathan et al. .. 700/94 |
| 2012/0284012 A1 | 11/2012 | Rodriguez et al. |
| 2012/0296938 A1 | 11/2012 | Koishida et al. |
| 2013/0013305 A1 | 1/2013 | Thompson et al. |
| 2013/0031216 A1 | 1/2013 | Willis et al. |
| 2013/0070093 A1* | 3/2013 | Rivera et al. .................. 348/143 |
| 2013/0318114 A1* | 11/2013 | Emerson, III ................ 707/758 |

OTHER PUBLICATIONS

Google Nexus 7 review: "Still the best small tablet," retrieved from http://reviews.cnet.com/google-nexus-7/, accessed on Dec. 21, 2012, 8 pp.

International Search Report and Written Opinion from International Application No. PCT/US2014/018339, dated Jun. 11, 2014, 13 pp.

Non-Final Office Action from U.S. Appl. No. 13/957,944, mailed Apr. 24, 2015 19 pp.

Magnini et al., "Is It the Right Answer? Exploiting Web Redundancy for Answer Validation," Proceedings of the 40th Annual Meeting on Association for Computational Linguistics, ACL, Jul. 6, 2002, pp. 425-432.

Cano et al., "A Review of Audio Fingerprinting," The Journal of VLSI Signal Processing, vol. 4, No. 3, Nov. 5, 2005, pp. 271-284.

International Preliminary Report on Patentability from International Application No. PCT/US2014/018339, mailed Sep. 17, 2015, 9 pp.

* cited by examiner

US 9,344,759 B2

ASSOCIATING AUDIO TRACKS OF AN ALBUM WITH VIDEO CONTENT

BACKGROUND

Content marketplace systems may provide users with the ability to purchase and/or access downloadable or streaming media content such as mobile applications, audio content and video content. A content marketplace system may include one or more computing devices (e.g., a desktop computer, a server system, a laptop, mobile phone) and/or one or more software applications connected via one or more networks. A content marketplace system may receive a request to purchase and/or access media content from a computing device (e.g., a mobile phone, a tablet computer) via one or more networks (e.g., the Internet). The content marketplace system may provide a user with the ability to download media content to his or her computing device and/or stream the media content from the content marketplace system. For instance, the content marketplace system may receive a request to stream a purchased video, such as a movie, on a user's device and send the movie as streaming content to the user's device.

In some cases, video content may include one or more audio tracks (e.g., songs). The audio tracks included in the video content may be part of an album that corresponds to the movie (e.g., a soundtrack album). When listening to an audio track (e.g., on a radio, in a TV show, at a concert, etc.), a user may desire information about the audio track in order to purchase the song, learn about other songs or albums by the same artist, or perform other actions. Certain computing devices may be able to perform functions in order to attempt to identify a currently playing audio track and provide information about the currently playing audio track.

For instance, a computing device may attempt to record data corresponding to a portion of an audio track (e.g., using a microphone), reduce the data into an audio fingerprint, and compare parts of the audio fingerprint to parts of one or more fingerprints in a database of known audio tracks. However, determining matches using such reduced data can have certain drawbacks. For example, when only a short portion of an audio track is used, or when the audio track is distorted, the computing device may find no matches for the audio track.

SUMMARY

In one example a method includes determining, by a computing device, an indication of video content, determining, by the computing device and based at least in part on the indication, one or more candidate albums, and selecting, by the computing device, a particular candidate album of the one or more candidate albums based at least in part on a match between an audio fingerprint of an audio track included in the video content and an audio fingerprint of an audio track included in the particular candidate album. The method may further include sending, by the computing device, a message that associates the video content with the particular candidate album.

In another example a computer-readable storage medium is encoded with instructions that, when executed, cause one or more processors to perform operations including determining an indication of video content, determining, based at least in part on the indication, one or more candidate albums, and selecting a particular candidate album of the one or more candidate albums based at least in part on a match between an audio fingerprint of an audio track included in the video content and an audio fingerprint of an audio track included in the particular candidate album. The computer-readable storage medium may be further encoded with instructions that, when executed, cause the one or more processors to perform operations including sending a message that associates the video content with the particular candidate album.

In another example a computing device includes one or more processors, wherein the one or more processors are configured to determine an indication of video content, determine, based at least in part on the indication, one or more candidate albums, and select a particular candidate album of the one or more candidate albums based at least in part on a match between an audio fingerprint of an audio track included in the video content and an audio fingerprint of an audio track included in the particular candidate album. The one or more processors may be further configured to send a message that associates the video content with the particular candidate album.

The details of one or more examples are set forth in the accompanying drawings and the description below. Other features, objects, and advantages will be apparent from the description and drawings, and from the claims.

DETAILED DESCRIPTION

Figure 1:
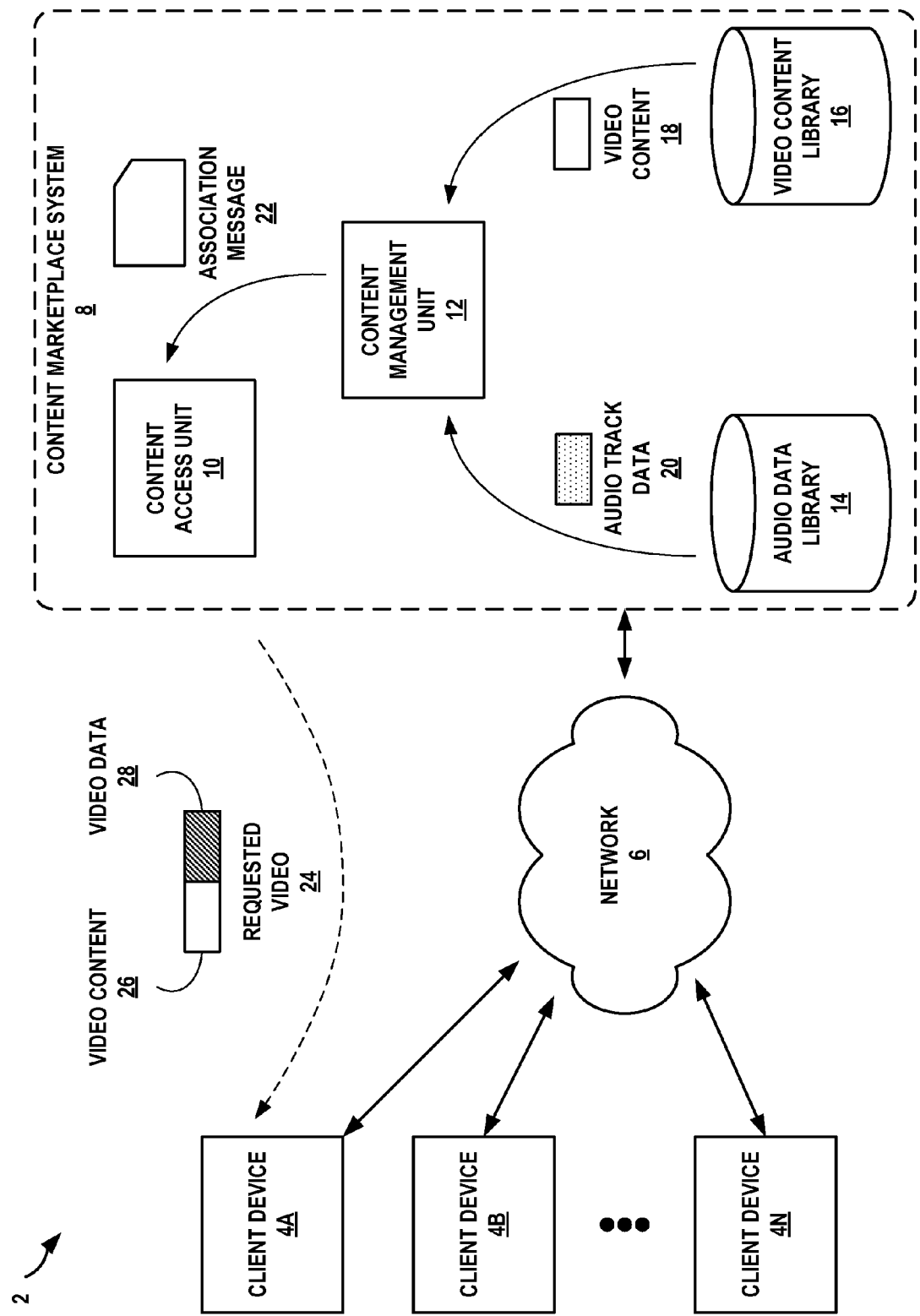
FIG. 1 is a block diagram illustrating an example computing environment in which a content marketplace system may be configured to identify audio tracks included in video content, in accordance with one or more aspects of the present disclosure.

Techniques of the disclosure are directed to determining an album and/or one or more known audio tracks to associate with video content (e.g., a movie or television show) by first performing a broad, relatively inexpensive search to determine a number of candidate albums, and then performing a more focused comparison to determine a particular album and/or known audio tracks to associate with the video content. Generally, video content, such as a movie, may include one or more songs as part of an audio portion for the movie. The audio portion may include a song in its entirety or only a short fragment of the song. While watching the movie on his or her device, a user may desire information about a currently playing song, such as the song artist, song title, album, and the like.

Content marketplace systems may include indications (e.g., audio fingerprints) of multiple, known audio tracks, as well as information about the audio tracks, such as song title, artist, album title, and the like. Techniques of the present disclosure provide a robust method for finding an album (e.g., a soundtrack album) and/or known audio tracks that correspond to video content in order to provide information about audio tracks included in the video content. Specifically, in some examples, techniques of the disclosure enable a device, such as part of a content marketplace system or other computing system, to first determine one or more candidate albums by using an indication of a first audio track included in the video content to perform a relatively broad but inexpensive search, and to subsequently use an audio fingerprint or sub-fingerprints of a second audio track included in the video content to determine a particular album and/or audio tracks through a more extensive, pairwise comparison. Techniques of the present disclosure may enable the device to provide a user with information (e.g., artist and song title) about a currently playing audio track included in video content without requiring the user to perform a manual search for the information. Furthermore, the techniques of the present disclosure may avoid the excessive storage and processing power required to perform extensive pairwise comparisons with numerous known audio tracks while still providing the flexibility and accuracy that such pairwise comparisons provide. In this way, techniques of the present disclosure may enhance the viewing experience for the user and/or increase interest in those audio tracks included in the video content.

In one aspect of the present disclosure, a content management unit of a content marketplace system may determine an album and/or one or more known audio tracks to associate with video content in order to provide a user viewing the video content with information about audio tracks included in the video content. For instance, the content marketplace system may receive and store new video content. The content marketplace system may receive the new video content from a user or administrator of the content marketplace system, or may receive or obtain the new video content from other sources (e.g., a production company, a television broadcast, digital or physical media such as a DVD, or other sources). The content management unit may process the new video content in order to provide the new video content to a user (e.g., a customer).

As part of processing the new video content, the content management unit may use the audio portion of the new video content to determine an indication of a first audio track (e.g., a song) included in the video content. The content management unit may use the indication to determine one or more candidate albums that each includes the first audio track. The content management unit may determine an audio fingerprint of a second audio track included in the new video content and use the audio fingerprint of the second audio track to determine a particular candidate album which includes the second audio track. After determining a particular candidate album, the content management unit may determine one or more known audio tracks that are included in the video content. The content management unit may send a message (e.g., to other components of the content marketplace system, or to another device) indicating an association between the particular candidate album and/or the known audio tracks and the video content. The message may also indicate those sections of the audio portion of the new video content that correspond to the respective known audio tracks (e.g., tracks of the particular candidate album).

After processing the new video content, the content marketplace system may store the video content as well as information about the associated album and/or associated known audio tracks. Thereafter, in response to receiving a request from a user to download or stream the video content, the content marketplace system may include data from the particular candidate album and/or the known audio tracks along with the video content. By determining a particular candidate album and associating the album with the video content, the content management unit may allow a user to obtain information about an audio track or song that is included in the video content.

In another aspect of the present disclosure, the content management unit may use information about the new video content, such as metadata or other information, to determine the one or more candidate albums. Using metadata of the video content may improve accuracy when, for example, the new video content contains only short and/or distorted fragments of audio tracks.

One or more techniques of the present disclosure may improve the accuracy of determining information about audio tracks included in video content. Using techniques of the disclosure, a content marketplace system and/or a content management unit thereof may determine an album to associate with video content and determine known audio tracks that correspond to sections of the audio portion of the video content. In this manner, the present disclosure may enable a content management unit or other computing device to provide a user with access to more accurate information about songs or other audio tracks included in video content.

FIG. 1 is a block diagram illustrating an example computing environment 2 in which a content marketplace system may be configured to identify audio tracks included in video content, in accordance with one or more aspects of the present disclosure. As shown in FIG. 1, computing environment 2 may include client devices 4A-4N (collectively, "client devices 4"), network 6, and content marketplace system 8. Client devices 4 may each be a computing device. Examples of computing devices may include, but are not limited to, portable, mobile, or other devices such as mobile phones (including smartphones), laptop computers, desktop computers, tablet computers, smart television platforms, personal digital assistants (PDAs), server computers, mainframes, and the like. For instance, in the example of FIG. 1, client device 4A may be a tablet computer, client device 4B may be a laptop computer, and client device 4N may be a smartphone. In various instances, client devices 4 may include various components for performing one or more functions such as output devices, input devices, network interface devices, and the like. For example, client devices 4 may include network interface devices for communicating with one or more networks, such as network 6.

Network 6 may represent any communication network, such as a packet-based digital network. In some examples, network 6 may represent any wired or wireless network such as the Internet, a private corporate intranet, or a public switched telephone network (PSTN). Network 6 may include both wired and wireless networks as well as both public and private networks. Content marketplace system 8 may contain one or more network interface devices for communicating with other devices, such as client devices 4, via network 6. For example, client device 4A may transmit a request to view video content via a wireless card to a publicly accessible wide area wireless network (which may comprise one example of network 6). The wide area network may route the request to content access unit 10, within content marketplace system 8, via a wired connection (in this particular non-limiting example).

Content marketplace system 8 may receive the request sent by client device 4A via network 6. Content marketplace system 8 may, in some examples, be a collection of one or more hardware devices, such as computing devices. In other examples, content marketplace system may be one or more software applications (e.g., program code) executable by one or more processors of a computing device or a group of computing devices. In yet another example, content marketplace system 8 may be a combination of both hardware devices and software applications executable by the hardware devices. While shown in FIG. 1 as a unitary system, content marketplace system 8 may include various units distributed over and communicatively connected via one or more networks (e.g., network 6).

As shown in FIG. 1, content marketplace system 8 may include audio data library 14 and video content library 16. In some examples, audio data library 14 and video content library 16 may be separate and distinct from other components of content marketplace system 8. In other examples, audio data library 14 and/or video content library 16 may be included in one or more other components of content marketplace system 8 (e.g., as part of content management unit 12).

Audio data library 14 may include audio track data associated with one or more known audio tracks. Examples of an audio track include, but may not be limited to, a song, a voice recording, a podcast, a ringtone, the audio portion of multimedia content (e.g., video content), or any other audio data. Audio track data for an audio track, in some examples, may include a song title of the audio track, an artist of the audio track, an author (e.g., the composer or artist) of the audio track, a duration of the audio track, lyrics for the audio track, or other types of information about the audio track. Audio track data may also include information about one or more albums on which the audio track is included. That is, the audio track data may include information such as an album playlist (e.g., a list of all the audio tracks included on the album), an album title, an album release date, an album artist, album author(s), or other album information. For instance, if a song is released on a debut album, and later re-released on a greatest hits album, the audio track data for the song may indicate an association with both the debut album and the greatest hits album.

In some examples, audio data library 14 may include known audio tracks. In other examples, audio data library 14 may not include the known audio tracks, but instead may only store associated audio track data. Audio data library 14 may also include one or more audio fingerprints of known audio tracks. Audio fingerprints may be determined using various methods. In some examples, audio fingerprints represent a short, distinct digital signature of an audio track. Audio fingerprints may be composed of one or more sub-fingerprints. Audio fingerprints and sub-fingerprints, as well as example determination methods, are further discussed with respect to FIG. 3 below.

Video content library 16 may store video content. Examples of video content may include, but may not be limited to, movies, television shows, webcasts, or other motion picture material. In some examples, video content may be user-created. Some video content may include both a video portion and an audio portion stored by video content library 16. As previously described, the audio portion of video content may include one or more audio tracks.

Video content library 16 may store metadata and/or soundtrack data associated with the video content. The metadata may be information that describes the video content. Metadata may, for example, include a title, a release date or air date, a duration, a producer, a director, a production studio, a video source (e.g., a username), or other information. Soundtrack data may indicate an album associated with the video content, one or more known audio tracks associated with the video content, and/or the times at which each audio track is played as part of the audio portion of the video content. For instance, soundtrack data associated with a movie may identify the soundtrack album for the movie, audio tracks that are included in the movie, and the times at which each audio track is used in the movie.

Metadata and/or soundtrack data may, in some examples, be received by content marketplace system 8 from one or more other sources, such as an administrator of content marketplace 8 or another device via network 6. For example, an administrator of content marketplace 8 may upload or otherwise store an episode of a television show to video content library 16 of content marketplace 8. In addition to the episode itself, the administrator may also upload and/or store metadata indicating an episode title, the duration of the episode, an episode air date, or the like to video content library 16. In other examples, one or more components of content marketplace system 8 (e.g., content management unit 12 or content access unit 10) may generate and store metadata and/or soundtrack data.

Content marketplace system 8 may include content management unit 12. In the example of FIG. 1, content management unit 12 may be a computing device (e.g., a server computer) capable of accessing, processing, generating, and/or storing video content and associated soundtrack data. In other examples, content management unit 12 may be software (e.g., an application) or firmware executable by one or more processors of a computing device. In accordance with one or more aspects of the present disclosure, content management unit 12 may receive video content and/or metadata, determine a particular candidate album to associate with the video content, and send an association message.

For example, content management unit 12 may access video content library 16 and receive video content 18. Content management unit 12 may, in some examples, receive metadata associated with video content 18 from video content library 16. Content management unit 12 may process the video content and/or the metadata to determine at least one indication of the video content. The indication may, in one example, be one or more audio fingerprints generated based on the audio portion of the video content. Content management unit 12 may access audio data library 14 and receive audio track data 20. Audio track data 20 may include one or more audio fingerprints, stored in audio data library 14, that are generated based on one or more known audio tracks (e.g., audio tracks "known" to content marketplace system 8). Using audio track data 20, content management unit 12 may search the audio fingerprints included in audio track data 20 using the one or more audio fingerprints generated based on the audio portion of the video content. In some examples, longer and/or less distorted audio tracks included in video content may typically result in a match in the initial search. However, by using the results of the initial search as starting points, or seeds, for further comparisons, content management unit 12 may determine remaining audio tracks included in the video content. That is, the initial search need not necessarily take extensive computing power to perform, because it may only return those matches that can be determined using, for example, a query to a database. The secondary search may be more extensive, but computing requirements may, in some examples, be significantly reduced by limiting the secondary search to those albums likely to be associated with the video content. Content management unit 12 may determine the album of a known audio track that resulted from the search and add the album to a set of candidate albums. Determination of a set of candidate albums is further discussed with respect to FIG. 3 below.

After determining the set of candidate albums, content management unit 12 may perform a more thorough comparison between the other audio fingerprints of audio tracks included in the video content and audio fingerprints of the known audio tracks on the candidate albums (e.g., those audio tracks which did not produce the match). As each candidate album includes at least one audio track matching an audio track included in the video content, it may be more likely that the candidate album is associated with the video content, such as a soundtrack album being associated with a movie. For instance, for each candidate album, content management unit 12 may determine the similarity (e.g., by computing a Hamming distance) between sub-fingerprints of an audio track included in the video content and sub-fingerprints of a known audio track included in the candidate album for all combinations of sub-fingerprints. The sub-fingerprints may be represented in binary format. As described in certain examples herein, the Hamming distance between two objects (e.g., character strings, binary strings, or other sequential data) is the number of positions in the sequence at which the corresponding symbols from the two sequences are different. In one example, such as for two binary sequences, the Hamming distance between the two sequences may be equal to the number of bits that would need to be flipped (e.g., changed from a 0 to a 1 or changed from a 1 to a 0) to turn one sequence into the other. In another example, comparisons may be performed on the byte level, and the value of each byte may be compared. When performing the more extensive search, the more thorough comparisons may provide a reduced threshold of similarity required to determine a match as compared to the initial search. That is, by using, for example, Hamming distances between sub-fingerprints to determine a match, a particular candidate album may be selected even when the same comparison of the two audio fingerprints may not have produced a match in the initial, faster search.

Based on the comparisons performed, content management unit 12 may select a particular candidate album that is most similar to the audio portion of the video content and/or one or more known audio tracks that are most similar to the audio tracks included in the audio portion of the video content. Selection of a particular candidate album from the set of candidate albums, as well as selection of known audio tracks, is further discussed with respect to FIG. 3 below.

Based on the selection of a particular candidate album and/or one or more known audio tracks, content management unit 12 may send association message 22. Content management unit 12 may send association message 22 to one or more components of content marketplace system 8 (e.g., content access unit 10) or to components not associated with content marketplace system 8. Association message 22 may indicate the processed video content and the particular candidate album and/or one or more known audio tracks. Association message 22 may also include information indicating which audio tracks appear at which times in the audio portion of the video content. That is, association message 22 may include an indication of the video content, and soundtrack data for the video content.

As shown in FIG. 1, content marketplace system 8 may include content access unit 10. In some examples, content access device 10 may be a computing device (e.g., a server computer) capable of receiving requests from one or more client devices and responding to the received requests. In other examples, content access unit 10 may be software (e.g., an application) or firmware executable by one or more processors of a computing device to receive requests from client devices and respond to the requests. In the example of FIG. 1, content access unit 10 may receive association message 22. In response to receiving association message 22, content access unit 10 may identify an association between video content 18 and the particular candidate album determined by content management unit 12. For instance, content access unit 10 may associate the soundtrack data with video content 18 to be stored in video content library 16.

Content marketplace system 8 may receive a request from a client device (e.g., one of client devices 4) and provide the request to content access unit 10. In response to receiving the request, content access unit 10 may, in some examples, perform an authentication procedure or one or more other functions unrelated to the techniques of the present disclosure. If content access unit 10, or another component of content marketplace system 8, determines that the client device which sent the request is authorized to access the requested video content, content access unit 10 may access video content library 16, retrieve the requested video content, and retrieve associated metadata and/or soundtrack data. Content access unit 10 may then provide the video content, along with the associated data to the requesting client device (e.g., via network 6).

For example, content marketplace system 8 may receive a request for video content 26 from client device 4A. Video content 26 may, in some examples, be the same as or similar to video content 18 processed by content management unit 12. Content access unit 10 may receive the request and retrieve video content 26 and associated soundtrack data 28, from video content library 16 or another source, such as another content marketplace system. In some examples, content access unit 10 may also retrieve associated metadata. The retrieved soundtrack data 28 may include an indication of a particular candidate album determined by content management unit 12 in accordance with one or more aspects of the present disclosure. Soundtrack data 28, in some examples, may include one or more indications of which audio tracks are included in the audio portion of video content 18 and at what times the audio tracks appear. Content access unit 10 may send video content 26 and the associated soundtrack data 28 to client device 4A as requested video 24 (e.g., via network 6). In some examples, content access unit 10 may provide a downloadable version of requested video 24 (e.g., as one or more files). That is, in these examples, client device 4A may download a copy of requested video 24 to be stored locally. In other examples, content access unit 10 may stream requested video 24 to the client device, such that client device 4A may require a connection to network 6 in order to access requested video 24.

Client device 4A may include an operating system and one or more applications capable of outputting requested video 24. That is, client device 4A may be capable of receiving requested video 24, playing video content 26 for a user, and displaying soundtrack data 28. By using soundtrack data 28, client device 4A may include functionality to display information about a currently playing audio track included in video content 26 at a display device while a user of client device 4A is watching video content 26 (e.g., displayed at the same display device or a different display device). In one non-limiting example, the display device of client device 4A may be a presence-sensitive display, such as a touchscreen. In some examples, information about a currently playing audio track included in video content 26 may be displayed at a display device concurrently with video content 26. In other examples, the information may be displayed at a display device responsive to user input at an input device, such as when the user inputs a selection to pause video content 26 or when the user provides other user input). The input device of client device 4A may, in one non-limiting example, be a presence-sensitive input device, such as a track pad or a touchscreen. By determining a particular candidate album to associate with video content, one or more components of content marketplace system 8 may enable client device 4A to display information about a currently playing audio track included in video content 26, such as an episode of a television show, a movie, or any other video content.

In some examples, techniques of the present disclosure may provide for accurate determination of an album and/or known audio tracks to associate with video content. Techniques of this disclosure may increase the efficiency and accuracy of determining the album and known audio tracks by performing a relatively fast and inexpensive search to determine a set of candidate albums, and then performing a more extensive comparison to determine a particular candidate album and/or known audio tracks to associate with the video content. Audio tracks included in video content that are longer and/or less distorted may typically be identified in the first, relatively inexpensive search. Audio tracks included in the video content that are short or distorted may be identified in the second, extensive search, because of the lower threshold of similarity required. In this way, techniques of the present disclosure may potentially reduce the processing and storage requirements of finding an album and/or known audio tracks to associate with video content while enhancing the viewing experience of video content for a user.

Figure 2:
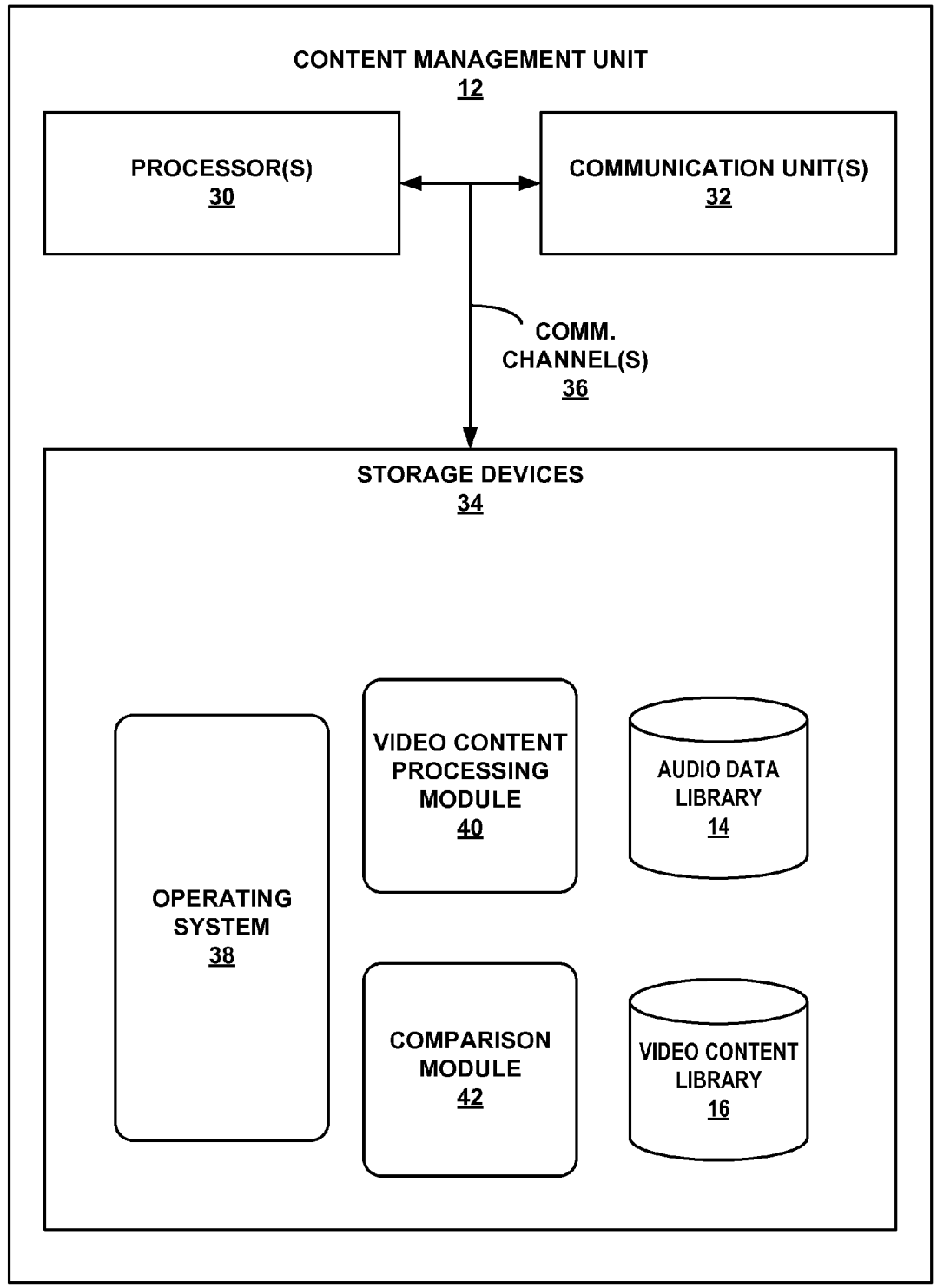
FIG. 2 is a block diagram illustrating one example of a device for determining an album to associate with video content, in accordance with one or more aspects of the present disclosure.

FIG. 2 is a block diagram illustrating one example of a content management unit for determining an album to associate with video content, in accordance with one or more aspects of the present disclosure. In the example of FIG. 2, content management unit 12 may comprise a device. However, FIG. 2 illustrates only one particular example of content management unit 12, and many other examples of content management unit 12 may be used in other instances.

As shown in the specific example of FIG. 2, content management unit 12 includes one or more processors 30, one or more communications units 32, and one or more storage devices 34. Content management unit 12 may further includes operating system 38, video content processing module 40, and comparison module 42. In the specific example of FIG. 2, content management unit 12 may also include audio data library 14, and video content library 16, though in other examples audio data library 14 and video content library 16 may not be included. Each of components 30, 32, and 34 may be interconnected (physically, communicatively, and/or operatively) for inter-component communications. In the example of FIG. 2, components 30, 32, and 34 may be coupled by one or more communications channels 36. In some examples, communications channels 36 may include a system bus, network connection, inter-process communication data structure, or any other channel for communicating data. Modules 40 and 42, as well as operating system 38, audio data library 40 and video content library 42 may also communicate information with one another as well as with other components in computing device 2.

Processors 30, in one example, are configured to implement functionality and/or process instructions for execution within content management unit 12. For example, processors 30 may be capable of processing instructions stored in storage devices 34. Examples of processors 30 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 34 may be configured to store information within content management unit 12 during operation. Storage devices 34, in some examples, are described as a computer-readable storage medium. In some examples, storage devices 34 are a temporary memory, meaning that a primary purpose of storage devices 34 is not long-term storage. Storage devices 34, in some examples, are described as a volatile memory, meaning that storage devices 34 do not maintain stored contents when the computer is turned off. Examples of volatile memories include random access memories (RAM), dynamic random access memories (DRAM), static random access memories (SRAM), and other forms of volatile memories known in the art. In some examples, storage devices 34 are used to store program instructions for execution by processors 30. Storage devices 34, in one example, are used by software or applications running on content management unit 12 (e.g., modules 40 and 42) to temporarily store information during program execution.

Storage devices 34, in some examples, also include one or more computer-readable storage media. Storage devices 34 may be configured to store larger amounts of information than volatile memory. Storage devices 34 may further be configured for long-term storage of information. In some examples, storage devices 34 include non-volatile storage elements. Examples of such non-volatile storage elements include magnetic hard discs, optical discs, floppy discs, flash memories, or forms of electrically programmable memories (EPROM) or electrically erasable and programmable memories (EEPROM).

Content management unit 12, in some examples, also includes one or more communication units 32. Content management unit 12, in one example, utilizes communication units 32 to communicate with external devices via one or more networks, such as network 6 of FIG. 1. Communication units 32 may include a network interface card, such as an Ethernet card, an optical transceiver, a radio frequency transceiver, or any other type of device that can send and receive information. Other examples of such network interfaces may include Bluetooth, 3G and WiFi radio components as well as Universal Serial Bus (USB). In some examples, content management unit 12 utilizes communication units 32 to wirelessly communicate with an external device such as one of client devices 4 of FIG. 1, or any other computing device.

In some examples, content management unit 12 may contain other components not shown in FIG. 2. For instance, content management unit 12 may contain one or more input devices, such as devices configured to receive input from a user through tactical, audio, or video feedback, and/or one or more output devices, such as devices configured to provide output to a user using tactile, audio, or video stimuli.

Content management unit 12 may include operating system 38. Operating system 38, in some examples, controls the operation of components of content management unit 12. For example, operating system 38, in one example, facilitates the communication of modules 40 and 42 with processors 30, communication units 32, and storage devices 34. Modules 40 and 42 may each include program instructions and/or data that are executable by content management unit 12. As one example, video content processing module 40 may include instructions that cause content management unit 12 to perform one or more of the operations and actions described in the present disclosure.

As shown in the specific example of FIG. 2, content management unit 12 may include audio data library 14. Audio data library 14 may be stored within storage devices 34. Audio data library 14 may include audio track data, associated with one or more known audio tracks, in a computer-readable format. In some examples, audio data library 14 may also include audio fingerprints (e.g., composed of one or more sub-fingerprints) of the audio tracks. The audio track data and/or audio fingerprints may be stored in one or more databases, such as a relational database or multi-dimensional database.

Audio data library 14 may, in some examples, include an inverted index of stored audio fingerprints for known audio tracks. An inverted index may be a searchable organization of data providing a reference of the file or files in which a search term is located. In some examples, the inverted index may include all sub-fingerprints that make up the audio fingerprints. For instance, the inverted index may include a number of keys, each a number (e.g., one, two, five) of bytes. Each key may be the value of a portion of a sub-fingerprint. For each key, the stored value may indicate one or more known audio tracks having sub-fingerprints that include the associated key. In some examples, the stored value may also indicate a time of the known audio tracks at which the sub-fingerprint that produced the associated key is located. That is, searching the inverted index with part (e.g., one byte, two bytes, five bytes, or more bytes) of a sub-fingerprint of an unknown audio track may result in an indication of what known audio tracks produced a sub-fingerprint having the same data sequence, as well as a time of the known audio track at which the same data sequence is located. Audio data library 14 may provide other components of content management unit 12 with access to audio track data, audio fingerprints, and/or the stored inverted index.

Content management unit 12, as shown in the specific example of FIG. 2, may include video content library 16. Video content library 16 may be stored within storage devices 34. Video content library 16 may store video content, associated metadata, and/or associated soundtrack data in a computer-readable format. The video content, metadata, and/or soundtrack data may be stored in one or more databases, such as a relational database or multi-dimensional database. In the example of FIG. 2, video content library 16 may provide other components of content management unit 12 with access to video content, metadata, and/or soundtrack data.

As shown in the specific example of FIG. 2, content management unit 12 may include video content processing module 40 and comparison module 42. Video content processing module 40 may be operable by processors 30 to retrieve video content and/or metadata from video content library 16, and process the video content and/or metadata to determine one or more indications of the video content. Comparison module 42 may be operable by processors 30 to receive one or more indications of video content, retrieve audio track data from audio data library 14, and compare the indications of video content to the audio track data to determine a particular candidate album and/or known audio tracks to associate with the video content.

In accordance with the techniques of the present disclosure, content management unit 12 may receive new video content and store the video content, as well as any associated metadata, in video content library 16. Content management unit 12 may process the received video content to determine soundtrack data to associate with the video content. In various examples, content management unit 12 may process the received video content in response to receiving the video content, in response to receiving a request for the video content from a client device, in response to some other input, or automatically at a specified time interval (e.g., daily).

Video content processing module 40 may access video content library 16 and retrieve new video content and/or associated metadata. Video content processing module 40 may determine one or more indications of the video content based on the video content and/or the associated metadata. In one example, the indications of the video content may include one or more audio fingerprints of audio tracks included in the video content. That is, content processing module 40 may use the audio portion of the video content to generate one or more distinct signatures based on audio tracks included in the audio portion of the video content. In other examples, the indications of the video content may be determined from the retrieved metadata and may include the title and/or release date of the video content. Video content processing module 40 may use metadata to determine indications when, for example, the video content includes only short fragments or distorted fragments of audio tracks. In yet other examples, video content processing module 40 may determine indications based on both the video content and the metadata. In any case, video content processing module 40 may send the determined indications to comparison module 42.

Comparison module 42 may receive the indications of video content from video content processing module 40. Comparison module 42 may access audio data library 14 and use the received indications to determine a set of candidate albums. In some examples, comparison module 42 may receive audio fingerprints from video content processing module 40. Comparison module 42 may use the received indications to perform a search of audio data library 14 (e.g., using the inverted index) to determine audio tracks which produced similar sub-fingerprints. Comparison module 42 may determine album information based on the audio track data associated with a known audio track that produced a similar sub-fingerprint. If a threshold number (e.g., one, two, or three) of matches are each associated with the same album, comparison module 42 may add the album to the set of candidate albums. As the threshold number of matches is increased, the set of candidate albums may include fewer albums, with each candidate album more likely to be an album associated with the video content (e.g., a soundtrack album).

In other examples, such as where the indication received by comparison module 42 includes a title and/or release date of the video content, comparison module 42 may use the indication to determine the set of candidate albums. That is, comparison module 42 may search the audio track data stored in audio data library 14 to determine albums which have the same or a similar title and/or the same or similar release date as the video content. For instance, comparison module 42 may receive an indication of a movie entitled "Scraphead Masterminds." Comparison module 42 may search the audio track data for album titles including the words "scraphead" and/or "masterminds." Comparison module 42 may, in some examples, include more or fewer words in the search, such as "soundtrack" or "movie."

In any case, after determining a set of candidate albums, comparison module 42 may perform a more extensive comparison based on sub-fingerprints to select a particular candidate album to associate with the video content. In one example, comparison module 42 may compare (e.g., by performing a pairwise comparison) sub-fingerprints of audio fingerprints received from video content processing module 40 with sub-fingerprints of audio fingerprints of audio tracks included in the candidate albums. Each comparison may result in a number of values (e.g., Hamming distances) indicating the similarity between bytes of the two sub-fingerprints that are compared. Comparison module 42 may, in one example, aggregate these values (e.g., for each audio track) and, based at least in part on the aggregates, select a particular candidate album and/or at least one known audio track. As another example, comparison module 42 may select, as the particular candidate album, the candidate album which produced the comparisons resulting in the smallest Hamming distances. Consequently, the particular candidate album may include audio tracks that are most similar to the audio tracks (or fragments of audio tracks) included in the video content.

In some examples, comparison module 42 may not compare all combinations of sub-fingerprints received from video content processing module 40 and sub-fingerprints of audio tracks included in the candidate albums. That is, comparison module 42 may utilize the temporal ordering of the audio tracks in the candidate albums and the temporal ordering of the audio tracks included in the video content to determine a particular candidate album and/or audio tracks. Constraining the comparison of audio fingerprints using temporal ordering may increase the accuracy of the more extensive search, as a typical soundtrack album orders the songs on the album in the same order in which they occur in the video content, according to some examples.

As one non-limiting example, an album may be added to the set of candidate albums as a result of a match between the audio fingerprint of the fourth audio track included in the album and an audio fingerprint of an audio track included in the video content. The fourth audio track included in the candidate album may be, for instance, the fourth of ten audio tracks included in the candidate album. Similarly, the audio track included in the video content may occur at a certain time, X, in the video content. Time X may be approximately halfway through the video content. In this instance, when comparing the audio fingerprints of other audio tracks included in the candidate album with the audio fingerprints of other audio tracks included in the video content, comparison module 42 may compare sub-fingerprints of those audio tracks included in the candidate album subsequent to the fourth audio track (e.g., the fifth audio track, the sixth audio track) only with sub-fingerprints of audio tracks included in the video content that occur at a time subsequent to time X. In other words, audio fingerprints of subsequent audio tracks included in the candidate album may only be compared with audio fingerprints of audio tracks included subsequent to time X in the video content. Conversely, audio fingerprints of prior audio tracks included in the candidate album may only be compared with audio fingerprints of audio tracks occurring prior to time X in the video content. In this way, comparison module 42 may select a particular candidate album in response to determining that an audio track included in the particular candidate album is at a temporal location of the particular candidate album subsequent to the temporal location of the audio track included in the particular candidate album that produced the match during the initial search, and that the occurrence of the same audio track is at a temporal location of the video content subsequent to the temporal location of the video content at which the audio track that produced the match in the initial search occurs. Similar temporal ordering constraints may also be applied when each candidate album includes two matches, three matches, or more matches.

After comparison module 42 selects a particular candidate album and/or one or more known audio tracks, content management unit 12 may send an association message (e.g., via communication units 32) to one or more components of content marketplace system 8. Comparison module 42 may also, in some examples, generate soundtrack data to be stored in video content library 16. The association message may indicate the particular candidate album to associate with the video content, one or more known audio tracks to associate with the video content, and/or the times during the video content at which known audio tracks are used. In this way, content management unit 12 may identify an album and/or known audio tracks to associate with video content. In addition, content management unit 12 may potentially reduce or negate the need for content marketplace system 8 to include extensive storage for all known audio tracks, instead only using audio track data and/or audio fingerprints, while maintaining the flexibility and accuracy of pairwise comparison techniques. Moreover, by providing this information along with requested video content, content marketplace system 8 may enable viewers of the video content to receive information (e.g., when pausing the video content or in subtitles for the video content) about currently playing audio tracks in the video content without having to manually search for such information.

Figure 3:
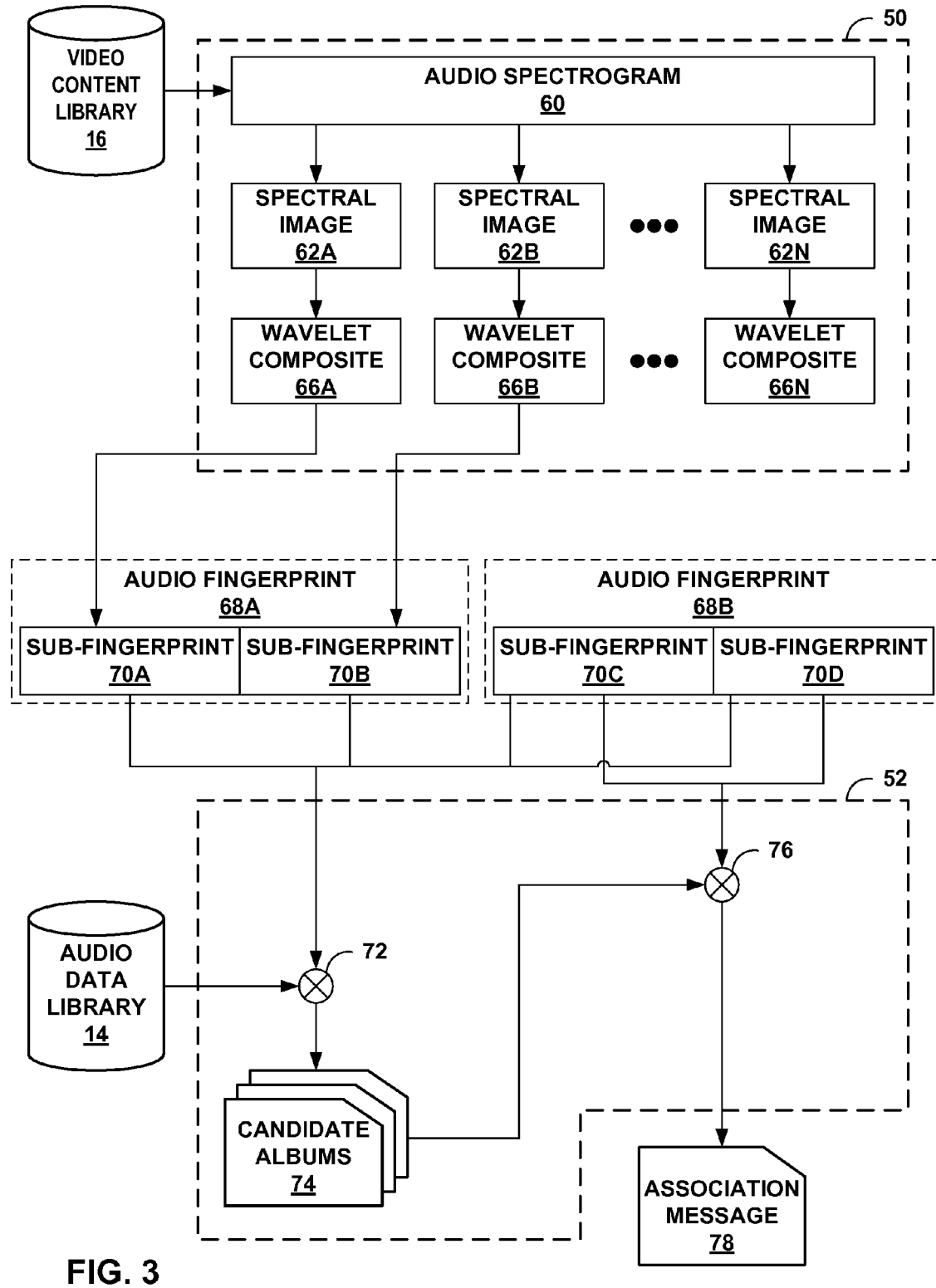
FIG. 3 is a block diagram illustrating an example process for determining an album to associate with video content, in accordance with one or more aspects of the present disclosure.

FIG. 3 is a block diagram illustrating an example process for determining an album to associate with video content, in accordance with one or more aspects of the present disclosure. FIG. 3 illustrates the operation of one particular example process, and many other possible processes may be used in other examples. For purposes of illustration only, the example process is performed by and described within the context of content management unit 12 of content marketplace system 8, as shown in FIGS. 1 and 2. Content management unit 12 may retrieve video content and determine one or more indications of the video content (e.g., audio fingerprints). Content management unit 12 may use the one or more indications to determine a set of candidate albums, and may compare audio fingerprints of the video content with audio fingerprints of known audio tracks to select a particular candidate album from the set of candidate albums. Content management unit 12 may send an association message indicating the particular candidate album to associate with the video content (e.g., as soundtrack data).

Content management unit 12 may access video content library 16, and retrieve video content (e.g., video content 18). In the example of FIG. 3, content management unit 12 may use video content 18 to determine one or more audio fingerprints. Various methods of generating one or more audio fingerprints may be used in accordance with techniques of the present disclosure. In one non-limiting example, audio fingerprints may be generated by applying wavelet transforms to a number of subsets of a spectrogram generated based on the audio portion of video content 18. Another example method of generating audio fingerprints may include generating feature vectors (based on amplitude, pitch, bandwidth, bass, and other characteristics) based on an audio signal. Further details regarding the example process for creating fingerprints as described in FIG. 3 can be found in "Content Fingerprinting Using Wavelets" Baluja et al.

In the example of FIG. 3, grouping 50 may represent operations performed by video content processing module 40 of content management unit 12, according to one example. Video content processing module 40 may receive video content 18 and determine audio spectrogram 60. Audio spectrogram 60 may be a spectrogram of the audio portion of video content 18. That is, audio spectrogram 60 may be a two-dimensional image of a time-varying spectral representation displaying the spectral density of the audio portion of video content 18 over the duration of the video content. In some examples, audio spectrogram 60 may not represent the full duration of the audio portion of video content 18 but instead may represent only a short section of the audio portion.

Video processing module 40 may determine one or more spectral images based at least in part on audio spectrogram 60. In the example of FIG. 3, spectral images 62A-62N (collectively "spectral images 62") may each represent a section, or subset, of the spectrogram. In some examples, spectral images 62 may be uniform in time length. That is, each spectrogram subset may cover the same duration (e.g., 20 milliseconds, 1.5 seconds, or other duration). In other examples, spectral images 62 may cover different durations. Spectral images 62 may be determined at random time positions of the spectrogram, or may be determined at specific intervals (e.g., every 10 milliseconds, every 2 seconds, or other interval). One or more of spectral images 62 may be based on sections of the audio portion of video content 18 which include an audio track. For instance, spectral image 62A may represent a section including a first audio track, and spectral image 62B may represent a section including a second audio track.

For at least one of spectral images 62, video content processing module 40 may, in some examples, determine one or more wavelet images. A wavelet image may be a two-dimensional image representing the result of applying a function commonly known as a "wavelet transform" to another two-dimensional image. Video processing module 40 may determine wavelet images by applying one of a number of different types of wavelet transforms to spectral images 62. Such types of wavelet transforms may include discrete wavelet transforms, complex wavelet transforms, or other types of wavelet transforms. The wavelet transforms may employ one of a number of different wavelets, such as Mathieu wavelets, Mexican hat wavelets, or Haar wavelets, to name only a few non-limiting examples.

Based on the determined wavelet images, video content processing module 40 may determine wavelet composites 66A-66N (collectively "wavelet composites 66"). Wavelet composites 66 may each be a two-dimensional image representing distinctive features of the underlying spectral image. In some examples, wavelet composite 66 may be determined by combining one or more wavelet images. For instance, video content processing module 40 may generate wavelet composite 66 by combining wavelet images including the top coefficient magnitudes. That is, video content processing module 40 may combine the wavelet image including the coefficient of the largest magnitude with the wavelet image including the coefficient of the second largest magnitude, and so on. In various examples, the number of combined wavelets may range from one wavelet image to multiple wavelet images (e.g., 200 or more wavelet images).

The determined wavelet composites 66 may constitute a two-dimensional sub-fingerprint of the underlying section of audio portion from which it was formed. For instance, wavelet composite 66A may be a sub-fingerprint of the audio portion represented by spectral image 62A. Thus, for example, wavelet composite 66A and wavelet composite 66B may each be a sub-fingerprint of the first audio track included in video content 18. Based on wavelet composites 66, video content processing module 40 may determine binary representations of the sub-fingerprints, such as sub-fingerprints 70A, 70B, 70C, and 70D (collectively "sub-fingerprints 70"). That is, video content processing module 40 may determine sub-fingerprint 70A based on wavelet composite 66A, sub-fingerprint 70B based on wavelet composite 66B, and so on. Each of sub-fingerprints 70 may include a number of bytes, such as 50, 100, or another number of bytes.

As shown in FIG. 3, sub-fingerprints 70A and 70B may, together, represent audio fingerprint 68A. Similarly, sub-fingerprints 70C and 70D may represent audio fingerprint 68B. For ease of understanding only, audio fingerprints 68A and 68B are shown in FIG. 3 as each containing only two sub-fingerprints. In various examples, audio fingerprints may include as many sub-fingerprints as may be needed (e.g., 10, 100, 1000, or other number) to represent the underlying audio track. In some examples, such as where sub-fingerprints are generated at a uniform rate, the total number of sub-fingerprints for an audio track may be proportional to the length of the audio track. Audio fingerprints 68A and 68B may be binary representations of the first audio track included in video content 18 and the second audio track included in video content 18, respectively. Though FIG. 3 shows only two binary representations of audio fingerprints, video content processing module 40 may generate any number of audio fingerprints for each audio track included in video content 18, in accordance with techniques of the present disclosure.

Grouping 52 may include operations performed by comparison module 42 of content management unit 12. One or more indications of video content 18 (e.g., audio fingerprints 68A and 68B) may be used by comparison module 42 to determine a set of candidate albums. Comparison module 42 may select, from the set of candidate albums, a particular candidate album to associate with video content 18 based at least in part on a match between one of audio fingerprints 68 and an audio fingerprint of a known audio track included in the particular candidate album. In various examples, comparison module 42 may select the particular candidate album based additionally on additional matches between audio fingerprints 68 and audio fingerprints of known audio tracks included in the particular candidate album.

Comparison module 42 may perform a broad, relatively inexpensive search using one or more audio fingerprints determined from video content 18 (e.g., audio fingerprints 68A, 68B). The sub-fingerprints of audio fingerprints 68A and 68B may be used by comparison module 42 to search for candidate albums (e.g., search 72). In various examples, search 72 may be performed using a number of techniques. In the example of FIG. 3, search 72 may utilize the inverted index stored in audio data library 14 to determine the set of candidate albums. For instance, search 72 may consist of partitioning each of sub-fingerprints 70 into a number of segments (e.g., each 5 bytes in size), and using each segment to search the inverted index. Comparison module 42 may use the inverted index to determine which sub-fingerprints of the known audio tracks also include segments corresponding to the determined keys. In some examples, none of the known audio tracks may include segments that correspond to the determined keys. This may be the case when, for instance, The first audio track included in the video content is not included in audio data library 14, when the first audio track included in the audio portion of video content 18 is too distorted (or too short for an accurate sub-fingerprint to be determined), or other such cases. In other examples, only a single sub-fingerprint of a known audio track may correspond to a determined key or multiple sub-fingerprints of various known audio tracks may correspond to a determined key.

Comparison module 42 may, as part of search 72, maintain a count of each known audio track indicated by one or more keys. In other words, each key corresponding to a segment of a sub-fingerprint determined from video content 18 may indicate a "hit" for one or more sub-fingerprints of known audio tracks. The hits may be counted as part of search 72. In some examples, known audio tracks which receive a threshold number of hits may be determined as matches. In other examples, any known audio tracks that receive even a single hit may be determined as matches. In performing search 72, comparison module 42 may, in some examples, account for the ordering of the segments when determining matches using the index. That is, an album including a known track, track X, may only be added to the set of candidate albums if a segment of a first sub-fingerprint (e.g., sub-fingerprint 70A) resulted in a hit on track X at a time, T, of track X and a segment of a subsequent sub-fingerprint within the same audio fingerprint (e.g., sub-fingerprint 70B) resulted in a hit on track X at a time of track X subsequent to time T.

Candidate albums 74 may be a list of album titles or other information identifying the albums included in the set. In other examples, candidate albums 74 may include more information for each of candidate albums 74, such as information indicating audio tracks included in the album (e.g., song titles for the audio tracks, audio fingerprints of the audio tracks, sub-fingerprints of the audio tracks, or other information).

Comparison module 42 may perform search 72 for one or more of the sub-fingerprints of audio-fingerprints 68. In some examples, comparison module 42 may add albums determined from search 72 to candidate albums 74 when at least a single audio fingerprint (e.g., audio fingerprint 68A or audio fingerprint 68B) matched a fingerprint of a known audio track included in the album. That is, when search 72 determines that an album includes at least one audio track included in video content 18, comparison module 42 may add the album to the set of candidate albums. In other examples, comparison module 42 may only add albums when at least two audio fingerprints (e.g., both audio fingerprints 68A and 68B) each matched a separate audio track included on an album. Thus candidate albums 74 may, in various examples, include information identifying albums which each include at least one audio track included in video content 18, albums which each include at least two audio tracks included in video content 18, or albums which each include another number of audio tracks included in video content 18. An album including more matches may increase the likelihood that the album is associated with video content 18 (e.g., a soundtrack album).

In the example of FIG. 3, search 72 may be performed with sub-fingerprints determined from audio fingerprints 68A and 68B. Comparison module 42 may determine albums to include in candidate albums 74 based on the results of search 72. Candidate albums 74 may also include information for known audio tracks included in one or more of candidate albums 74, such as audio fingerprints and/or sub-fingerprints. Each of the albums included in candidate albums 74 may include a known audio track having an audio fingerprint sufficiently similar to the audio fingerprint 68A. Search 72 may result in no matches for audio fingerprint 68B.

Using information from candidate albums 74 (e.g., audio fingerprints of known audio tracks included in candidate albums 74), comparison module 42 may perform a relatively thorough, pairwise comparison to select a particular candidate album to associate with video content 18 and/or one or more known audio tracks to associate with video content 18. In the example of FIG. 3, comparison module 42 may perform search 76 to compare those audio fingerprints that did not result in a match with audio fingerprints from candidate albums 74. By performing a pairwise comparison and avoiding, for example, using the inverted index, search 76 may be more likely to find matches for short and/or distorted audio tracks included in video content 18. Because each of candidate albums 74 is more likely to be associated with video content 18, the pairwise comparison of search 76 may not employ as high a threshold when determining a match between audio tracks. Search 76 may, in various examples, include a number of comparison techniques. For instance, search 76 may include comparing sub-fingerprints of all audio fingerprints determined from video content 18 that did not result in a match with sub-fingerprints of all audio fingerprints of known audio tracks included in candidate albums 74. In some examples, search 76 may include determining the Hamming distance for each comparison (e.g., a byte-wise comparison). In other examples, search 76 may include determining the Hamming distance between the sub-fingerprints determined from video content 18 and sub-fingerprints determined from audio tracks included in candidate albums 74.

Search 76, in the example of FIG. 3, may include determining the Hamming distance between each byte of an audio fingerprint for an audio track included in video content 18 and every byte of an audio fingerprint for a known audio track included in at least one of candidate albums 74. That is, search 76 may include determining, for each album included in candidate albums 74, the Hamming distance between every combination of (1) bytes of audio fingerprints determined from the audio portion of video content 18 that did not result in a match in search 72, and (2) bytes of audio fingerprints determined from a known audio track included on a certain album of candidate albums 74 that did not result in a match in search 72. Search 76 may include creating a matrix of Hamming distances for each audio fingerprint combination, determining audio track matches based on the matrices, and selecting the album that has the most audio track matches as the particular candidate album. In order to determine an audio track match, a matrix of Hamming distances may be required to contain a sequence of Hamming distances that average out to be below a certain value. That is, a match may be determined when a matrix includes a sequence of zeros or near-zero numbers (e.g., indicating a small Hamming distance between the two compared bytes) in a diagonal direction. The location of the zeroes or near-zero numbers may indicate the exact time and duration of the matching audio track as it is used in video content 18.

In some examples, comparison module 42 may have a threshold number of audio track matches that a candidate album must satisfy in order for to be selected as the particular candidate album. In such instance, if no candidate album results in a sufficiently high number of matches, comparison module 42 may, in some examples, not determine a specific candidate album, or perform other functions unrelated to the present disclosure.

As shown in FIG. 3, comparison module 42 may send association message 78 (e.g., to one or more other components of content management unit 12 or content marketplace system 8). Association message 78 may include an indication of the particular candidate album resulting from search 76. In some examples, association message 78 may include other information, such as an indication of video content 18, an indication of one or more audio tracks to be associated with video content 18, one or more indications of the times at which an audio track is used in video content 18, or other information. For instance, comparison module 42 may send association message 78 to content access unit 10. Association message 78 may include album information for the particular candidate album to associate with video content 18, audio track data for each of the known audio tracks included on the particular candidate album, and indications of when each known audio track is used in video content 18. Content access unit 10 may, in some examples, store the received information as soundtrack data associated with video content 18 to video content library 16. In other examples, content access unit 10 may provide the received information to a client device along with the video content. In this way, content management unit 12 may enable content marketplace system 8 to provide users with audio track information for audio tracks included in movies and other video content by providing a robust method of album identification and/or audio track identification for video content.

Figure 4:
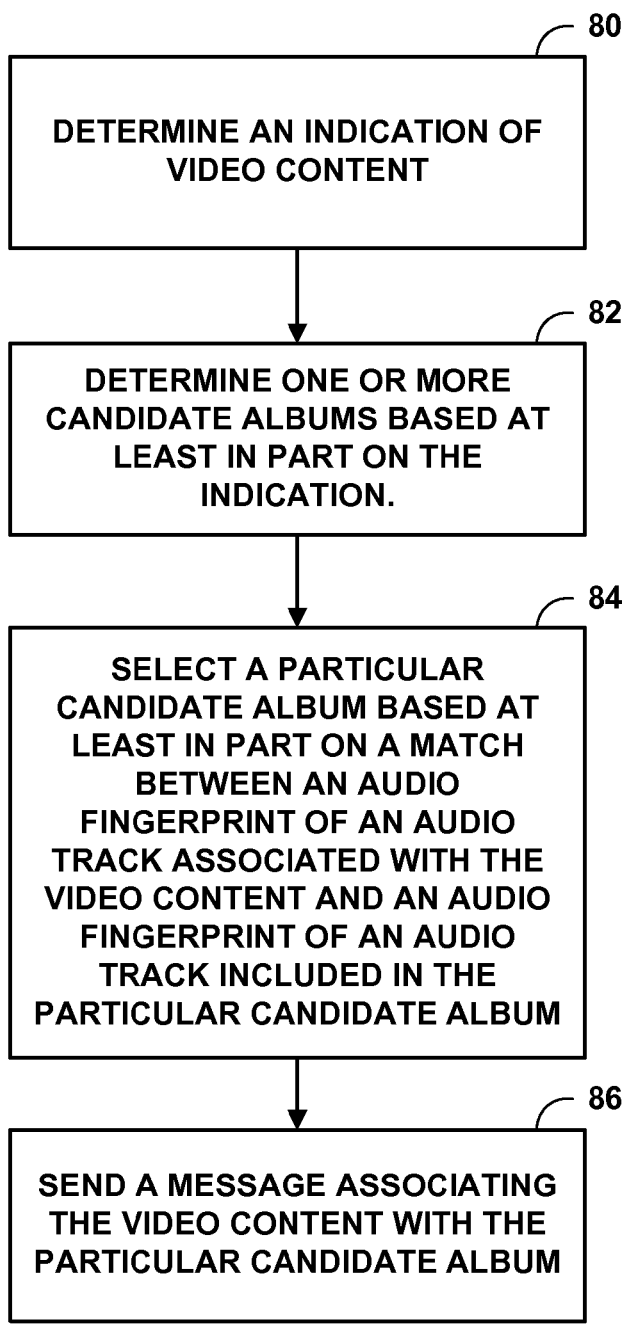
FIG. 4 is a flow diagram illustrating an example process for determining an album to associate with video content, in accordance with one or more aspects of the present disclosure.

FIG. 4 is a flow diagram illustrating an example process for determining an album to associate with video content, in accordance with one or more aspects of the present disclosure. For purposes of illustration only, the example operations are described below within the context of content management unit 12 of content marketplace system 8, as shown in FIGS. 1 and 2.

In the example of FIG. 4, content management unit 12 may determine an indication of video content (80). Content management unit 12 may determine one or more candidate albums based at least in part on the indication (82). Content management unit 12 may select a particular candidate album based at least in part on a match between an audio fingerprint of an audio track associated with the video content and an audio fingerprint of an audio track included in the particular candidate album (84). Content management unit 12 may send a message that associates the video content with the particular candidate album (86).

In some examples, the audio track included in the video content is a first audio track, determining the indication of the video content comprises determining an indication of a second audio track included in the video content, the second audio track being different from the first audio track, and the one or more candidate albums each include the second audio track. In some examples, the operations may include determining, by the computing device, an indication of a third audio track included in the video content, wherein determining the one or more candidate albums is further based at least in part on the indication of the third audio track, and wherein the one or more candidate albums each further includes the third audio track. In some examples, determining the indication of the second audio track comprises determining at least one audio fingerprint of the second audio track.

In some examples, selecting the particular candidate album of the one or more candidate albums comprises selecting the particular candidate album responsive to determining that the audio track included in the particular candidate album is included at a temporal location of the particular candidate album subsequent to a temporal location of the particular candidate album at which the second audio track is included in the particular candidate album, and an occurrence of the first audio track is at a temporal location of the video content subsequent to a temporal location of the video content at which the second audio track occurs. In some examples, selecting the particular candidate album of the one or more candidate albums comprises selecting the particular candidate album responsive to determining that the audio track included in the particular candidate album is included at a temporal location of the particular candidate album prior to a temporal location of the particular candidate album at which the second audio track is included in the particular candidate album, and an occurrence of the first audio track is at a temporal location of the video content prior to a temporal location of the video content at which the second audio track occurs. In some examples, selecting the particular candidate album of the one or more candidate albums comprises determining a Hamming distance between a sub-fingerprint of the audio fingerprint of the audio track included in the video content and a sub-fingerprint of the audio fingerprint of the audio track included in the particular candidate album.

In some examples, the message comprises information identifying the video content, the particular candidate album, and at least one indication of a time of the video content at which the audio track included in the particular candidate album occurs in the video content. In some examples, the operations further include receiving, by the computing device, a request to access the video content, and sending, by the computing device and to a user device, data associated with the particular candidate album. In some examples, the operations further include storing, by the computing device and in one or more data stores, the video content and at least an indication of the particular candidate album.

In some examples, determining the one or more candidate albums comprises determining the one or more candidate albums based at least in part on metadata associated with the video content. In some examples, the metadata comprises at least one of a title of the video content, a release date of the video content, a director of the video content, and a producer of the video content.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may include one or more computer-readable storage media.

A computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
 determining, by a computing device, an indication of video content;
 determining, by the computing device and based at least in part on the indication, a plurality of candidate albums, wherein each candidate album of the plurality of candidate albums comprises a respective plurality of audio tracks;

determining, by the computing device, a first match between an audio fingerprint of a first audio track included in the video content and an audio fingerprint of a first audio track included in the respective plurality of audio tracks for a particular candidate album;

determining, by the computing device, a second match between an audio fingerprint of a second audio track included in the video content and an audio fingerprint of a second audio track included in the respective plurality of audio tracks for the particular candidate album, wherein a temporal ordering of the first and second audio tracks included in the video content is the same as a temporal ordering of the first and second audio tracks included in the respective plurality of audio tracks for the particular candidate album;

selecting, by the computing device and based at least in part on the first match and the second match, the particular candidate album from the plurality of candidate albums; and sending, by the computing device, a message that associates the video content with the particular candidate album.

2. The method of claim 1, wherein:

determining the indication of the video content comprises determining an indication of the second audio track included in the video content.

3. The method of claim 2, further comprising determining, by the computing device, an indication of a third audio track included in the video content, wherein determining the plurality of candidate albums is further based at least in part on the indication of the third audio track, and wherein the respective plurality of audio tracks for each of the plurality of candidate albums further includes the third audio track.

4. The method of claim 2, wherein selecting the particular candidate album of the plurality of candidate albums comprises selecting the particular candidate album responsive to determining that:

the first audio track included in the respective plurality of audio tracks for the particular candidate album is included at a temporal location of the particular candidate album subsequent to a temporal location of the particular candidate album at which the second audio track is included in the respective plurality of audio tracks for the particular candidate album; and an occurrence of the first audio track included in the video content is at a temporal location of the video content subsequent to a temporal location of the video content at which the second audio track included in the video content occurs.

5. The method of claim 2, wherein selecting the particular candidate album of the plurality of candidate albums comprises selecting the particular candidate album responsive to determining that:

the first audio track included in the respective plurality of audio tracks for the particular candidate album is included at a temporal location of the particular candidate album prior to a temporal location of the particular candidate album at which the second audio track is included in the respective plurality of audio tracks for the particular candidate album; and an occurrence of the first audio track included in the video content is at a temporal location of the video content prior to a temporal location of the video content at which the second audio track included in the video content occurs.

6. The method of claim 1, wherein selecting the particular candidate album of the plurality of candidate albums comprises determining a Hamming distance between a sub-fingerprint of the audio fingerprint of the first audio track included in the video content and a sub-fingerprint of the audio fingerprint of the first audio track included in the respective plurality of audio tracks for the particular candidate album.

7. The method of claim 1, wherein the message comprises information identifying the video content, the particular candidate album, and at least one indication of a time of the video content at which at least one of the first audio track or the second audio track included in the particular candidate album occurs in the video content.

8. The method of claim 1, further comprising:

receiving, by the computing device, a request to access the video content; and sending, by the computing device and to a user device, data associated with the particular candidate album.

9. The method of claim 1, further comprising storing, by the computing device and in one or more data stores, the video content and at least an indication of the particular candidate album.

10. The method of claim 1, wherein determining the plurality of candidate albums comprises determining the plurality of candidate albums based at least in part on metadata associated with the video content.

11. The method of claim 10, wherein the metadata comprises at least one of a title of the video content, a release date of the video content, a director of the video content, and a producer of the video content.

12. A non-transitory computer-readable medium encoded with instructions that, when executed, cause one or more processors to perform operations comprising:

determining an indication of video content;

determining, based at least in part on the indication, a plurality of candidate albums, wherein each candidate album of the plurality of candidate albums comprises a respective plurality of audio tracks;

determine a first match between an audio fingerprint of a first audio track included in the video content and an audio fingerprint of a first audio track included in the respective plurality of audio tracks for a particular candidate album;

determine a second match between an audio fingerprint of a second audio track included in the video content and an audio fingerprint of a second audio track included in the respective plurality of audio tracks for the particular candidate album, wherein a temporal ordering of the first and second audio tracks included in the video content is the same as a temporal ordering of the first and second audio tracks included in the respective plurality of audio tracks for the particular candidate album;

selecting, based at least in part on the first match and the second match, the particular candidate album from the plurality of candidate albums; and sending a message that associates the video content with the particular candidate album.

13. The non-transitory computer-readable medium of claim 12, wherein:

determining the indication of the video content comprises determining an indication of the second audio track included in the video content.

14. The non-transitory computer-readable medium of claim 13, wherein the operations further comprise determining an indication of a third audio track included in the video content, wherein determining the plurality of candidate albums is further based at least in part on the indication of the third audio track, and wherein the respective plurality of audio tracks for each of the plurality of candidate albums further includes the third audio track.

15. A computing device, comprising:
one or more processors,
wherein the one or more processors are configured to:
determine an indication of video content;
determine, based at least in part on the indication, a plurality of candidate albums, wherein each candidate album of the plurality of candidate albums comprises a respective plurality of audio tracks;
determine a first match between an audio fingerprint of a first audio track included in the video content and an audio fingerprint of a first audio track included in the respective plurality of audio tracks for a particular candidate album;
determine a second match between an audio fingerprint of a second audio track included in the video content and an audio fingerprint of a second audio track included in the respective plurality of audio tracks for the particular candidate album, wherein a temporal ordering of the first and second audio tracks included in the video content is the same as a temporal ordering of the first and second audio tracks included in the respective plurality of audio tracks for the particular candidate album;
select, based at least in part on the first match and the second match, the particular candidate album from the plurality of candidate albums; and
send a message that associates the video content with the particular candidate album.

16. The computing device of claim 15, wherein:
the one or more processors are configured to determine the indication of the video content at least by determining an indication of the second audio track included in the video content.

17. The computing device of claim 16, wherein the one or more processors are further configured to determine an indication of a third audio track included in the video content, wherein determining the plurality of candidate albums is further based at least in part on the indication of the third audio track, and wherein the respective plurality of audio tracks for each of the plurality of candidate albums further includes the third audio track.

18. The method of claim 1, wherein the video content comprises a movie, and wherein the particular candidate album comprises a soundtrack album associated with the movie.

\* \* \* \* \*